United States Patent
Murison et al.

(10) Patent No.: US 7,817,682 B2
(45) Date of Patent: *Oct. 19, 2010

(54) METHOD AND SYSTEM FOR TUNABLE PULSED LASER SOURCE

(75) Inventors: Richard Murison, St-Lazare (CA); Tullio Panarello, St-Lazare (CA); Benoit Reid, Laval (CA); Reynald Boula-Picard, Montreal (CA); Pascal Deladurantaye, St-Joseph de la Pointe-Levy (CA); Robert Larose, Laval (CA); Yves Taillon, Saint-Augustin de Desmaures (CA); Francois Brunet, Quebec (CA)

(73) Assignee: PyroPhotonics Lasers Inc., Dollard-des-Ormeaux, Quebec (CA)

( * ) Notice: Subject to any disclaimer, the term of this patent is extended or adjusted under 35 U.S.C. 154(b) by 47 days.

This patent is subject to a terminal disclaimer.

(21) Appl. No.: 12/252,287

(22) Filed: Oct. 15, 2008

(65) Prior Publication Data
US 2009/0147808 A1 Jun. 11, 2009

Related U.S. Application Data

(63) Continuation of application No. 11/737,052, filed on Apr. 18, 2007, now Pat. No. 7,443,893.

(60) Provisional application No. 60/793,307, filed on Apr. 18, 2006.

(51) Int. Cl.
*H01S 3/30* (2006.01)

(52) U.S. Cl. .......................... 372/6; 372/26; 372/50.11; 372/99

(58) Field of Classification Search .............. 372/50.11, 372/6, 26
See application file for complete search history.

(56) References Cited

U.S. PATENT DOCUMENTS

| 5,400,350 | A | 3/1995 | Galvanauskas |
| 5,745,284 | A | 4/1998 | Goldberg et al. |
| 6,148,011 | A | 11/2000 | Larose et al. |
| 6,621,619 | B2 | 9/2003 | Strutz et al. |
| 7,110,168 | B2 | 9/2006 | Lee et al. |
| 7,113,327 | B2 | 9/2006 | Gu et al. |
| 7,256,930 | B2 | 8/2007 | Liu |
| 7,440,162 | B2 | 10/2008 | Gu et al. |
| 7,443,893 | B2 * | 10/2008 | Murison et al. ............... 372/26 |
| 7,457,329 | B2 | 11/2008 | Murison et al. |
| 2003/0142392 | A1 | 7/2003 | Strutz et al. |
| 2004/0052276 | A1 | 3/2004 | Lou et al. |
| 2004/0161250 | A1 | 8/2004 | Kozlowski et al. |

(Continued)

*Primary Examiner*—Dung T Nguyen
(74) *Attorney, Agent, or Firm*—Townsend and Townsend and Crew LLP

(57) ABSTRACT

A tunable pulsed laser source comprising a seed source adapted to generate a seed signal and an optical circulator. The optical circulator includes a first port coupled to the seed source, a second port, and a third port. The laser source also includes an amplitude modulator characterized by a first side and a second side. The first side is coupled to the second port of the optical circulator. The laser source further includes a first optical amplifier characterized by an input end and a reflective end including a spectral-domain reflectance filter. The input end is coupled to the second side of the amplitude modulator. Moreover, the laser source includes a second optical amplifier coupled to the third port of the optical circulator.

20 Claims, 3 Drawing Sheets

U.S. PATENT DOCUMENTS

2006/0262388  A1   11/2006  Starodoumov et al.
2008/0181266  A1   7/2008   Deladurantaye et al.
2009/0086773  A1   4/2009   Murison et al.

* cited by examiner

METHOD AND SYSTEM FOR TUNABLE PULSED LASER SOURCE

CROSS-REFERENCES TO RELATED APPLICATIONS

This application is a continuation of U.S. patent application Ser. No. 11/737,052, filed on Apr. 18, 2007, entitled "Method and System for Tunable Pulsed Laser Source," which claims benefit under 35 U.S.C. §119(e) of U.S. Provisional Patent Application No. 60/793,307, filed Apr. 18, 2006, entitled "Method and System for Tunable Pulsed Laser Source." The contents of both above-referenced applications are hereby incorporated by reference in their entirety.

BACKGROUND OF THE INVENTION

The present invention relates generally to the field of tunable laser sources. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

Pulsed laser sources, such as Nd:YAG lasers have been used to perform laser-based material processing for applications such as marking, engraving, micromachining, and cutting. Depending on the application and the materials to be processed, the various characteristics of the laser pulses, including pulse width, pulse repetition rate, peak power or energy, and pulse shape, are selected as appropriate to the particular application. Many existing high power pulsed lasers, for example, have pulse energy greater than 0.5 mJ per pulse) rely on techniques such as Q-switching and mode locking to generate optical pulses. However, such lasers produce optical pulses with characteristics that are predetermined by the cavity geometry, the mirror reflectivities, and the like and cannot generally be varied in the field without compromising the laser performance. Using such lasers, it is generally difficult to achieve a range of variable pulse characteristics.

Thus, there is a need in the art for pulsed laser sources with tunable pulse characteristics.

SUMMARY OF THE INVENTION

According to the present invention, techniques related generally to the field of tunable laser sources are provided. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

According to an embodiment of the present invention, a tunable pulsed laser source is provided. The tunable pulse laser source includes a seed source adapted to generate a seed signal and an optical circulator. The optical circulator includes a first port coupled to the seed source, a second port, and a third port. The tunable pulse laser source also includes an amplitude modulator characterized by a first side and a second side. The first side is coupled to the second port of the optical circulator. The tunable pulse laser source further includes a first optical amplifier characterized by an input end and a reflective end including a spectral-domain reflectance filter. The input end is coupled to the second side of the amplitude modulator. Moreover, the tunable pulse laser source includes a second optical amplifier coupled to the third port of the optical circulator.

According to another embodiment of the present invention, a method of providing one or more laser pulses is provided. The method includes providing a seed signal at a first port of an optical circulator, transmitting the seed signal to the first side of an amplitude modulator, and transmitting the seed signal through the amplitude modulator to define a first pass through the amplitude modulator. The method also includes time-domain filtering the seed signal to provide a pulse. Time-domain filtering includes modulating a drive signal for the amplitude modulator. The method further includes amplifying the pulse using a first optical amplifier and frequency-domain filtering the amplified pulse to provide a spectrally filtered pulse. Additionally, the method includes transmitting the spectrally filtered pulse through the amplitude modulator to define a second pass through the amplitude modulator and time-domain filtering the amplified spectrally filtered pulse to provide an intermediate pulse. Time-domain filtering includes modulating the drive signal for the amplitude modulator. Moreover, the method includes amplifying the intermediate pulse using a second optical amplifier.

Numerous benefits are achieved using the present invention over conventional techniques. For example, in an embodiment according to the present invention, high power, pulsed lasers suitable for laser processing are provided that utilize a compact architecture that is inexpensive in comparison to lasers with comparable performance characteristics. Moreover, in embodiments of the present invention, short pulses are generated with pulse characteristics that are tunable in real-time while maintaining pulse-to-pulse stability. Furthermore, in an embodiment according to the present invention, optical pulses can be shaped to optimize the pulse profile for the particular application, or to maximize energy extraction efficiency in the laser system. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
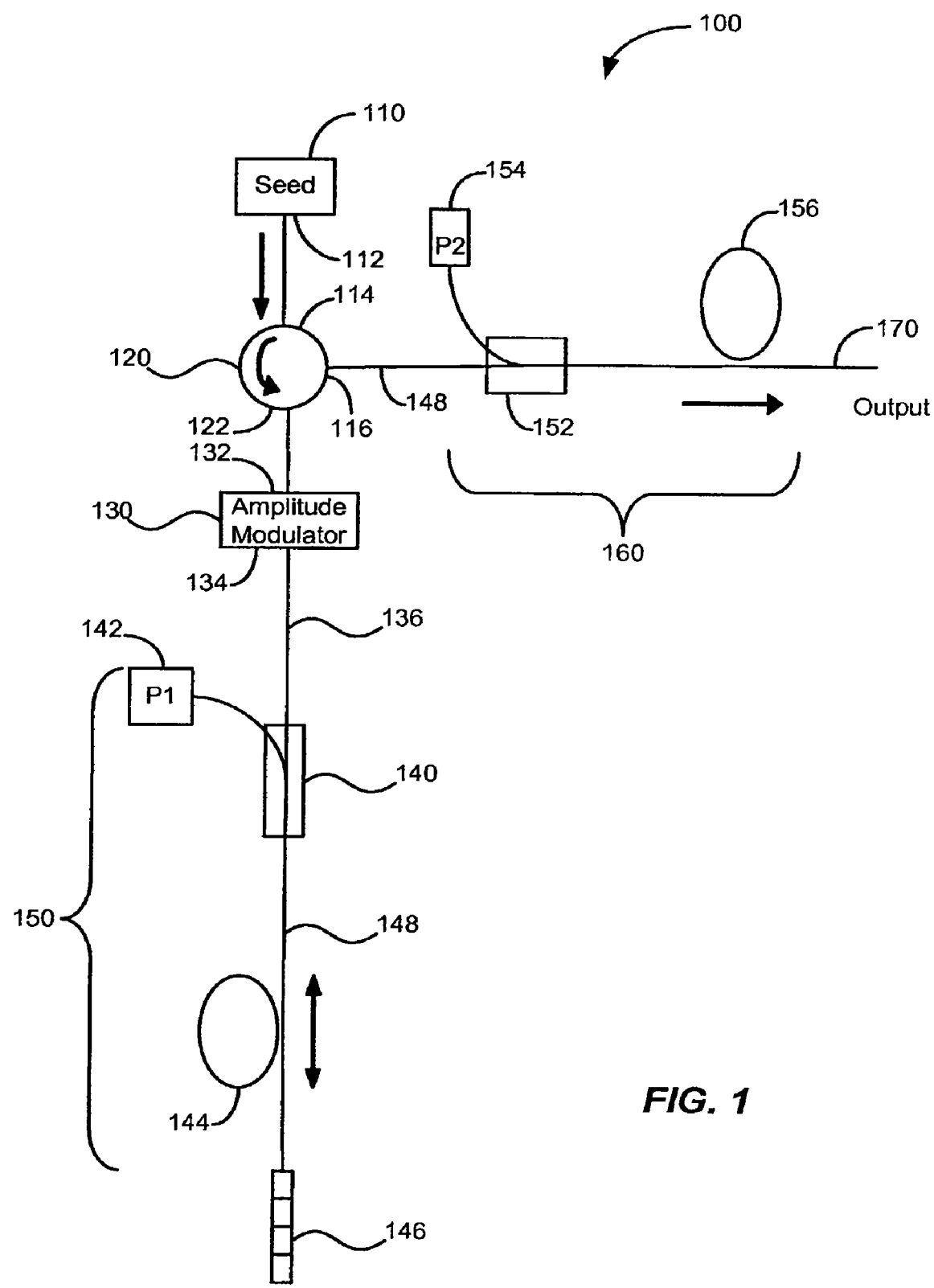
FIG. 1 is a simplified schematic illustration of a high power pulsed laser with tunable pulse characteristics using optical fiber amplifiers according to an embodiment of the present invention.

FIG. 1 is a simplified schematic illustration of a high power pulsed laser with tunable pulse characteristics using optical fiber amplifiers according to an embodiment of the present invention. High power pulsed laser 100 includes a seed source 110 that generates a seed signal that is injected into a first port 114 of an optical circulator 120. According to an embodiment of the present invention, the optical seed signal is generated by using a seed source 110 that is a continuous wave (CW) semiconductor laser. In a particular embodiment, the CW semiconductor laser is a fiber Bragg grating (FBG) stabilized semiconductor diode laser operating at a wavelength of 1032 nm with an output power of 20 mW. In another particular embodiment, the CW semiconductor laser is an external cavity semiconductor diode laser operating at a wavelength of 1064 nm with an output power of 100 mW. The output power may be lower or greater than 100 mW. For example, the output power can be 50 mW, 150 mW, 200 mW, 250 mW, or the like. In alternative embodiments, the seed signal is generated by a compact solid-state laser or a fiber laser. One of ordinary skill in the art would recognize many variations, modifications, and alternatives.

After passing through the optical circulator 120, the seed signal exits from a second port 122 of the circulator 120 and impinges on a first side 132 of an optical amplitude modulator 130. Circulators are well known in the art and are available from several suppliers, for example, model OC-3-1064-PM from OFR, Inc. of Caldwell, N.J.

The optical amplitude modulator 130 is normally held in an "off" state, in which the signal impinging on the modulator is not transmitted. According to embodiments of the present invention, optical amplitude modulator provides amplitude modulation and time-domain filtering of the seed signal as well as amplified spontaneous emission (ASE) filtering. In a particular embodiment, the length of the optical pulse is determined by the operation of the optical amplitude modulator 130, which may be an APE-type Lithium Niobate Mach-Zehnder modulator having a bandwidth >3 GHz at 1064 nm.

According to embodiments of the present invention, the optical amplitude modulator 130 is an electro-optic Mach-Zehnder type modulator, which provides the bandwidth necessary for generating short optical pulses. In other embodiments, the optical amplitude modulator 130 is a phase or frequency modulator with a suitable phase or frequency to amplitude converter, such as an edge optical filter, an extinction modulator, or an acousto-optic modulator. For example, an electro-optic phase modulator can induce a frequency chirp to the optical signal, which would be converted into an amplitude modulation when the optical signal is transmitted through a short or long pass optical filter. Preferably, the optical signal would be characterized by a wavelength that experiences high loss when no electrical signal is applied to the electro-optic phase modulator. When an electrical signal is applied to the electro-optic phase modulator, the optical signal preferably experiences a change in wavelength or frequency chirp to a value characterized by low optical loss.

In order to pass the seed signal, the optical amplitude modulator 130 is pulsed to the "on" state for a first time to generate an optical pulse along optical path 136. The pulse width and pulse shape of the optical pulse generated by the optical amplitude modulator 130 are controlled via by the modulator drive signal applied to the optical amplitude modulator 130. The optical pulse then passes for a first time through a first optical amplifier 150, where it is amplified. According to embodiments of the present invention, the amplitude modulator, driven by a time varying drive signal, provides time-domain filtering of the seed signal, thereby generating a laser pulse with predetermined pulse characteristics, including pulse width, pulse shape, and pulse repetition rate.

According to an embodiment of the present invention, the optical amplifier 150 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing optical amplifier 150 utilize polarization-maintaining single-mode fiber.

Referring to FIG. 1, in embodiments utilizing fiber amplifiers, a pump 142 is coupled to a rare-earth-doped fiber loop 144 through optical coupler 140. Generally, a semiconductor pump laser is used as pump 142. One of ordinary skill in the art would recognize many variations, modifications, and alternatives. In alternative embodiments, the optical amplifier 150 is a solid-state amplifier including, but not limited to, a solid-state rod amplifier, a solid-state disk amplifier or gaseous gain media.

In a particular embodiment, the optical amplifier 150 includes a 5 meter length of rare-earth doped fiber 144, having a core diameter of approximately 4.1 μm, and doped with Ytterbium to a doping density of approximately $4 \times 10^{24}$ ions/$m^3$. The amplifier 150 also includes a pump 142, which is an FBG-stabilised semiconductor laser diode operating at a wavelength of 976 nm, and having an output power of 100 mW. The output power can be lower or greater than 100 mW. For example, it can be 50 mW, 150 mW, 200 mW, 250 mW, 300 mW, 350 mW, 400 mW, or the like. In another particular embodiment, the pump 142 is a semiconductor laser diode operating at a wavelength of about 915 nm. In yet another particular embodiment, the pump 142 is a semiconductor laser diode operating at an output power of 450 mW or more. In a specific embodiment, the amplifier 150 also includes a pump to fiber coupler 140, which is a WDM pump combiner.

The signal emerging from optical amplifier 150 along optical path 148 then impinges on a reflecting structure 146, and is reflected back into optical amplifier 150. The signal passes for a second time through optical amplifier 150, wherein the signal is amplified. The reflecting structure 146 performs spectral domain filtering of the laser pulse and of the amplified spontaneous emission (ASE) propagating past optical path 148. Thus, the seed signal experiences both amplitude and time-domain modulation passing through amplitude modulator 130, and spectral-domain filtering upon reflection from reflecting structure 146.

In an embodiment, the reflecting structure 146 is a fiber Bragg grating (FBG) that is written directly in the fiber used as the optical amplifier 150. The periodicity and grating characteristics of the FBG are selected to provide desired reflectance coefficients as is well known in the art. Merely by way of example in a particular embodiment, the reflecting structure 146 is a FBG having a peak reflectance greater than 90%, and a center wavelength and spectral width closely matched to the output of the seed source 110.

The signal emerging from optical amplifier 150 along optical path 136 impinges on the second side 134 of the optical amplitude modulator 130, which is then pulsed to the "on" state a second time to allow the incident pulse to pass through. According to embodiments of the present invention, the timing of the second "on" pulse of the optical amplitude modulator 130 is synchronized with the first opening of the modulator 130 (first "on" pulse) to take account of the transit time of the signal through the amplifier 150 and the reflecting structure 146. After emerging from the first side of the optical amplitude modulator 130, the amplified pulse then enters the second port 122 of optical circulator 120, and exits from the third port 116 of optical circulator 120 along optical path 148.

The signal is then amplified as it passes through a second optical amplifier 160. As discussed in relation to FIG. 1, embodiments of the present invention utilize a fiber amplifier as optical amplifier 160, including a pump 154 that is coupled to a rare-earth-doped fiber loop 156 through an optical coupler 152. Generally, a semiconductor pump laser is used as pump 154, although pumping of optical amplifiers can be achieved by other means as will be evident to one of skill in the art. In a particular embodiment, the second optical amplifier 160 includes a 5 meter length of rare-earth doped fiber 156, having a core diameter of approximately 4.8 µm, and is doped with Ytterbium to a doping density of approximately $6 \times 10^{24}$ ions/$m^3$. The amplifier 160 also includes a pump 154, which is an FBG-stabilised semiconductor laser diode operating at a wavelength of 976 nm, and having an output power of 500 mW. In another particular embodiment, the second optical amplifier 160 includes a 2 meter length of rare-earth doped fiber 156, having a core diameter of approximately 10 µm, and is doped with Ytterbium to a doping density of approximately $1 \times 10^{26}$ ions/$m^3$. The fiber length can be shorter or longer than 2 meters. For example, it can be 1.0 m, 3.0 m, 3.5 m, 4.0 m, 4.5 m, 5.0 m, or the like. The amplifier 160 can also include a multimode pump 154, which is a semiconductor laser diode having an output power of 5 W. The output power can be lower or greater than 5 W. For example, it can be 3 W, 4 W, 6 W, 7 W, 8 W, 9 W, 10 W, or the like.

In another particular embodiment, in order to pass the seed signal, the optical amplitude modulator 130 is pulsed once instead of twice. The optical amplitude modulator 130 is turned to the "on" state to generate the rising edge of the pulse propagating along optical path 136. This signal is then amplified a first time through optical amplifier 150. The signal then impinges on the reflecting structure 146 and is amplified a second time through optical amplifier 150. Now the signal emerging from optical amplifier 150 along optical path 136 impinges on the second side 134 of the optical amplitude modulator 130, which is subsequently turned to the "off" state. The pulse width is therefore given by the time duration during which the optical amplitude modulator 130 is held in the "on" state subtracted by the transit time of the signal through the amplifier 150 and the reflecting structure 146.

Although FIG. 1 illustrates the use of a single optical amplifier 160 coupled to the third port of the optical circulator 120, this is not required by the present invention. In alternative embodiments, multiple optical amplifiers are utilized downstream of the optical circulator 120 as appropriate to the particular applications. One of ordinary skill in the art would recognize many variations, modifications, and alternatives.

Figure 2:
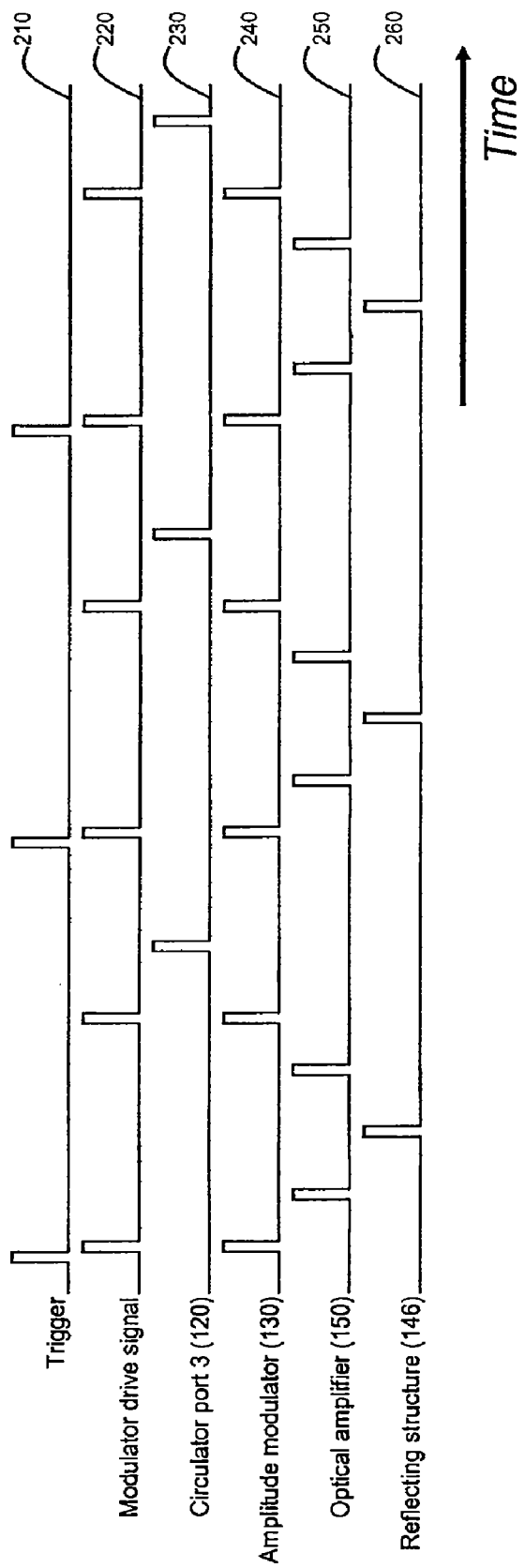
FIG. 2 is a simplified timing diagram illustrating electrical and optical pulses at different locations in a high power pulsed laser according to an embodiment of the present invention.

FIG. 2 is a simplified timing diagram illustrating electrical and optical pulses at different locations in a high power pulsed laser according to an embodiment of the present invention. Merely by way of example, FIG. 2 illustrates the timing of repetitive electrical drive signals to the amplitude modulator and optical pulses propagating through an embodiment of the invention as described in FIG. 1. Following an electrical trigger 210, a first electrical drive signal 220 is applied to the amplitude modulator to generate an optical pulse 240. After some propagation delay, the optical signal 250 passes through the optical amplifier a first time. The optical signal 260 then impinges on the reflecting structure and passes through the optical amplifier a second time 250. The optical pulses 240 are transmitted through the amplitude modulator a second time, which is driven electrically a second time 220 with the optical pulses 240. Finally the optical pulses 230 exit port 3 of the circulator after some propagation delay.

Figure 3:
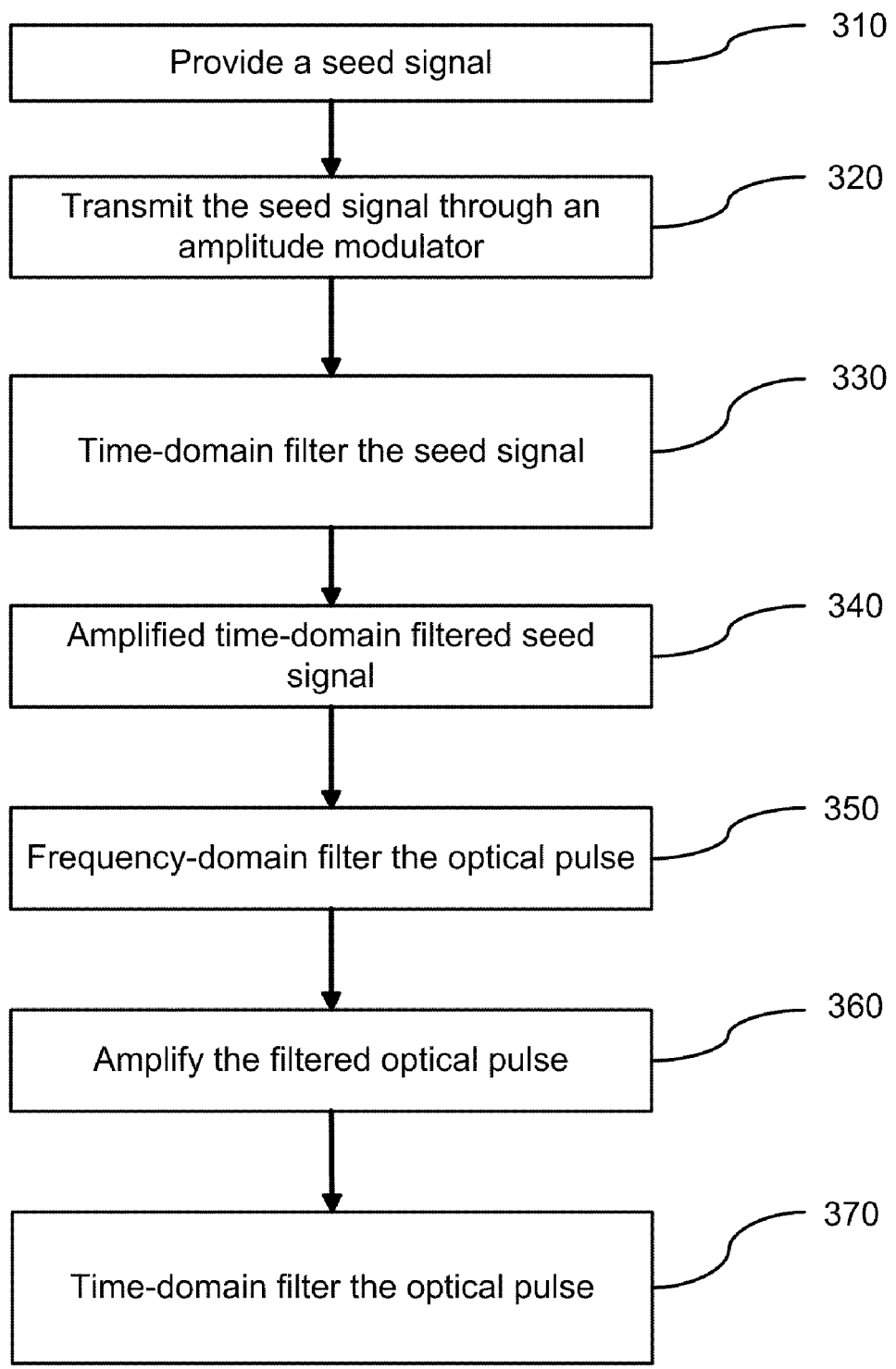
FIG. 3 is a simplified illustration of a method of providing a series of laser pulses according to an embodiment of the present invention.

FIG. 3 is a simplified illustration of a method of providing a series of laser pulses according to an embodiment of the present invention. The method includes providing a seed signal (310). In embodiments of the present invention, the seed signal can be generated by a semiconductor laser at a wavelength of 1064 nm. The method also includes the transmission of the seed signal through an amplitude modulator (320) for a first time. In embodiments of the present invention, the coupling of the seed signal into the amplitude modulator can be facilitated by an optical circulator or other means of optical coupling. The method further provides for time-domain filtering of the seed signal by applying a drive signal to the amplitude modulator a first time (330). The pulse is amplified by the optical amplifier (340) and frequency-domain filtered (350). Thus, a spectrally filtered pulse is provided at one stage of the system illustrated in FIG. 3.

It will be appreciated that several combinations of amplifiers and frequency-domain filtering architectures can be utilized without departing from the scope of the embodiments described herein. For example, the frequency-domain filtering can be achieved before or after amplification of the pulse. Additionally, frequency-domain filtering can be achieved after a first amplification of the pulse and before a second amplification of the pulse as would happen in a double-pass optical amplifier. Moreover, the method includes transmitting the optical signal a second time through the amplitude modulator (360) and providing time-domain filtering of the pulsed signal by applying a drive signal to the amplitude modulator a second time (370). After passing through the amplitude modulator a second time, the amplified spectrally and temporally filtered pulse may be referred to as an intermediate pulse. In embodiments of the present invention, the optical pulse is generated by modulating the seed signal during a first-pass transmission through the amplitude modulator and is then gated during a second-pass transmission through the amplitude modulator.

Utilizing embodiments of the present invention, high power pulsed laser sources are provided that generate streams of optical pulses with independently adjustable pulse characteristics including pulse width, peak power and energy, pulse shape, and pulse repetition rate. Merely by way of example, a particular embodiment of the present invention delivers output pulses at the output 170 of second optical amplifier 160 of more than 5 µJ per pulse at a pulse width of 10 ns and at a repetition rate of 10 kHz. Of course, other pulse characteristics are provided by alternative embodiments. For example, the pulse energy can be 1 µJ, 10 µJ, 20 µJ, 30 µJ, or the like. The pulse duration is in a range of values, for example, between 2 ns and 150 ns. The pulse repetition frequency is in a range of values, for example, 0 to 500 kHz.

In the embodiments described above, a CW seed source is utilized and time-domain filtering to provide a laser pulse is performed using the amplitude modulator 120. However, this is not required by the present invention. In an alternative embodiment, the seed signal is modulated to provide a pulsed seed signal rather than CW seed signal. Providing a pulsed seed signal minimizes parasitic signal build-up caused by seed leakage and enables the operating power range of the seed source to be increased. For example, the pulse seed output power can be 200 mW, 500 mW, or even 1 W. In this alternative embodiment, the pulsed seed signal may be of a pulse width equal to, or longer than the desired pulse width of overall pulsed laser source. Pulsing the seed can also increase the effective linewidth of the seed laser to reduce Stimulated Brillouin Scattering (SBS).

According to embodiments of the present invention, methods and systems are provided that result in the generation of sequences of optical pulses, which may not be equally separated in time. Moreover, the pulse widths and pulse energies are individually tailored in a predetermined manner from pulse to pulse. Furthermore, it will be recognized that although the above description discussed the generation of a single optical pulse, embodiments of the present invention provide for the generation of multiple pulses by repeating the single pulse a multiplicity of times. These multiple pulses may include an arbitrary train of optical pulse sequences.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A tunable pulsed laser source comprising:
   a seed source characterized by a seed wavelength;
   an optical circulator including a first port coupled to the seed source, a second port, and a third port;
   an amplitude modulator characterized by a first side and a second side, wherein the first side is coupled to the second port of the optical circulator;
   a first optical amplifier characterized by an input end and an output end, wherein the input end is coupled to the second side of the amplitude modulator; and
   a reflective component coupled to the output end of the first optical amplifier.

2. The tunable pulsed laser source of claim 1 further comprising a second optical amplifier coupled to the third port of the optical circulator.

3. The tunable pulsed laser source of claim 1 wherein the reflective component comprises a fiber Bragg grating (FBG) having a constant grating period.

4. The tunable pulsed laser source of claim 3 wherein the FBG is characterized by a peak reflectance at the seed wavelength of greater than 90%.

5. The tunable pulsed laser source of claim 1 wherein the amplitude modulator comprises a Mach-Zehnder interferometric amplitude modulator adapted to perform time-domain transmission filtering of the seed signal.

6. The tunable pulsed laser source of claim 1 wherein the first optical amplifier comprises a double-pass fiber amplifier.

7. A tunable pulsed laser source comprising:
   a seed source adapted to generate a seed signal;
   an optical circulator including a first port coupled to the seed source, a second port, and a third port;
   an amplitude modulator characterized by a first side and a second side, wherein the first side is coupled to the second port of the optical circulator;
   a first optical amplifier characterized by an input end and an output end, wherein the input end is coupled to the second side of the amplitude modulator; and
   a fiber Bragg grating (FBG) coupled to the output end of the first optical amplifier.

8. The tunable pulsed laser source of claim 7 wherein the FBG comprises a chirped FBG characterized by a variation in grating period.

9. The tunable pulsed laser source of claim 8 where the variation in grating period is linear.

10. The tunable pulsed laser source of claim 8 where the variation in grating period is exponential.

11. The tunable pulsed laser source of claim 7 further comprising a second optical amplifier coupled to the third port of the optical circulator.

12. The tunable pulsed laser source of claim 7 wherein the first optical fiber amplifier comprises a double-pass fiber amplifier.

13. The tunable pulsed laser source of claim 7 wherein the first optical amplifier comprises a rare-earth doped optical fiber.

14. A tunable pulsed laser source comprising:
   a seed source characterized by a seed wavelength and a seed signal spectral bandwidth;
   an optical circulator including a first port coupled to the seed source, a second port, and a third port;
   an amplitude modulator characterized by a first side and a second side, wherein the first side is coupled to the second port of the optical circulator;
   a first optical amplifier characterized by an input end and an output end, wherein the input end is coupled to the second side of the amplitude modulator; and
   a reflective structure coupled to the output end of the first optical amplifier.

15. The tunable pulsed laser source of claim 14 wherein the reflective structure comprises a first fiber Bragg grating (FBG) and a second FBG optically coupled to the output end of the first optical amplifier, wherein the first FBG is separated by a first distance from the output end of the first optical amplifier and the second FBG is separated by a second distance from the output end of the first optical amplifier.

16. The tunable pulsed laser source of claim 15 wherein the first FBG is characterized by a peak reflectance at a first wavelength and the second FBG is characterized by a peak reflectance at a second wavelength.

17. The tunable pulsed laser source of claim 16 wherein the first wavelength and the second wavelength are within the seed signal spectral bandwidth.

18. The tunable pulsed laser source of claim 16 wherein a peak reflectance at the first wavelength and the second wavelength is greater than 90%.

19. The tunable pulsed laser source of claim 14 further comprising a second optical amplifier coupled to the third port of the optical circulator.

20. The tunable pulsed laser source of claim 14 wherein the first optical amplifier comprises a rare-earth doped optical fiber.

* * * * *